United States Patent [19]

de Boer et al.

[11] Patent Number: 5,254,351
[45] Date of Patent: Oct. 19, 1993

[54] DEEP-FROZEN, PRE-PROOFED DOUGHS

[75] Inventors: Hendrikus B. de Boer, Rockanje; Marjolein L. Hagemans, Vlaardingen; Birgit Nestl, Rotterdam, all of Netherlands; Jakob van der Meer, Tokyo, Japan

[73] Assignee: Van den Bergh Foods Co., Division of Conopco, Inc., Lisle, Ill.

[21] Appl. No.: 812,554

[22] Filed: Dec. 23, 1991

[30] Foreign Application Priority Data

Dec. 28, 1990 [EP] European Pat. Off. ........ 90203515.3
Jun. 4, 1991 [EP] European Pat. Off. ........ 91201349.7

[51] Int. Cl.$^5$ .............................................. A21D 2/26
[52] U.S. Cl. ..................................... 426/23; 426/62; 426/549
[58] Field of Search .................... 426/23, 62, 549

[56] References Cited

U.S. PATENT DOCUMENTS

| | | |
|---|---|---|
| 3,547,659 | 12/1970 | Cort . |
| 3,649,304 | 3/1972 | Fehr, Jr. et al. . |
| 4,130,555 | 12/1978 | Ohtsuka et al. . |
| 4,324,811 | 4/1982 | Eugley . |
| 4,387,420 | 6/1983 | Yong et al. . |
| 4,406,911 | 9/1983 | Larson et al. . |
| 4,450,177 | 5/1984 | Larson et al. . |
| 4,451,491 | 5/1984 | Trop et al. . |
| 4,861,604 | 8/1989 | Tang et al. . |
| 4,935,251 | 6/1990 | Verhoef et al. . |
| 5,097,058 | 3/1992 | Cannata et al. . |

FOREIGN PATENT DOCUMENTS 62-285773 12/1987 Japan .

OTHER PUBLICATIONS

Patent Abstracts of Japan, Abstracting 62-285773, Abstract publication date May 25, 1988.
Derwent Abstract of JP 2177848.
Derwent Abstract of JP 1262771.
Derwent Abstract of JP 88007739.
Derwent Abstract of FR 2589043.
Derwent Abstract of JP 60160833.
Derwent Abstract of JP 84016746.

*Primary Examiner*—Joseph Golian
*Attorney, Agent, or Firm*—Rimma Mitelman

[57] ABSTRACT

The invention concerns with deep frozen, pre-proofed doughs that contain 0.5–10 wt % of a gelatin relating compound, optionally in combination with other dough improvers like ascorbic acid, vital gluten, xylanase, amylase or DATA-esters. In particular the combination with xylanase/amylase leads to unexpected results (s.v. and/or ovenspring of baked products made from the doughs). As gelatin relating compounds gelatin, hydrolysed gelatin, collagen hydrolysate and/or gelatin precursors can be used.

14 Claims, No Drawings

DEEP-FROZEN, PRE-PROOFED DOUGHS

The preparation of a dough, involving mixing of the components, partial pre-proofing step(s), resting step(s), moulding steps and full-proofing steps, after which the moulded products have to be baked immediately, is a time-consuming process for bakers. Accordingly, many attempts have been made to develop processes and/or doughs that can be carried out or prepared on one particular day, whereupon the dough is frozen, whereafter the baking can be carried out at the moment that suits the baker best. However, these attempts have not been very successful so far because the specific volume and ovenspring of the products that could be prepared were far less than those prepared from the non-frozen doughs.

In U.S. Pat. No. 4,406,911 frozen, lean-bread doughs are disclosed that are prepared from doughs containing the normal ingredients needed for preparing doughs (water, flour and yeast) and wherein also an amount of a film-forming protein is present. The film-forming proteins mentioned are vital gluten, egg albumin, beef albumen, selected legume protein isolates, milk proteins, soya milk legume protein isolates, cereal grain protein isolates, while in the Examples only the use of egg proteins is illustrated. In order to obtain the desired dough, it is necessary to perform a very specific process for preparing the doughs.

A similar process and dough are mentioned in U.S. Pat. No. 4,450,177.

Therefore, in these references nothing is disclosed about the use of gelatin relating compounds in the preparation of deep-frozen, pre-proofed doughs, in particular deep-frozen, pre-proofed lean doughs.

In literature there are many references about the use of gelatin in food products. In JP 02 177 848 the use of gelatin in pie products is described. In JP 0 126 771 it is disclosed that gelatin can be used in desserts, leading to a product having a reduced calorific content. According to U.S. Pat. No. 4,861,604 a dough filling can be made that contains gelatin. Frozen fritters containing gelatin are the subject of ES 2 006 416. In EP 285 196 Unilever has disclosed the use of gelatin in croutons.

Some applications of gelatin in doughs can also be found in literature. JP 60 160 833, for example, discloses bread doughs with improved staling properties that contain a) a gummy substance, b) starchy material and c) protein, e.g. gelatin. In U.S. Pat. No. 4,451,491 wheat-free bread mixes are described, comprising non-wheat starch, a gluten substitute gum and an emulsified fat. In this mix, gelatin can also be incorporated as binding agent. In U.S. Pat. No. 4 324 811 dough-like products are described, containing a protein material, gelatin, a polyphosphate, a gum, a whipping aid and balance a starch material. From JP 88,007,739: U.S. Pat. Nos. 3,547,659 and 4,130,555 it is known to use hydrolysed gelatin in bread doughs. The gelatin product is added because of its water- or moisture retaining properties, or to impart flavour and aroma to bread or biscuits. However, none of these references are concerned with the use of gelatin in deep-frozen, pre-proofed doughs.

Therefore, it was quite surprising that the use of a gelatin relating compound in deep-frozen, pre-proofed doughs should lead to products with such excellent specific volumes and ovenspring properties. Moreover it was found that the storage stability of these products was surprisingly good.

Our invention therefore relates to deep-frozen, pre-proofed doughs, in particular lean doughs with less than 10 wt. %, based on the flour, of fat, which comprise the conventional dough-forming ingredients, i.e. at least flour, water and yeast, characterized by the presence of 0.5-10 wt. %, based on the flour, of a gelatin relating compound in the dough. The preferred amount of a gelatin relating compound is 1.5-7.5 wt. %.

The specific volume and the ovenspring of products, in particular buns, which are obtained after baking of deep-frozen, moulded pieces of pre-proofed dough with the composition of the invention, show a surprising improvement in comparison with doughs containing egg white as film-forming protein in accordance with U.S. Pat. Nos. 4,406,911 and 4,450,177.

The deep-frozen, pre-proofed, moulded dough products can be baked directly in an oven without thawing and/or further proofing. This means that the time-consuming process of the past for making and baking the end products can be avoided now, while the results are approximately the same as in the case of non-frozen doughs.

The doughs according to the invention can also be shaped as a laminated dough wherein the different dough layers are separated by fat layers.

The gelatin relating compound, that can be used according to our invention can be chosen from gelling gelatin, preferably with bloom rates of 50-300, non-gelling gelatin derivatives, preferably with bloom-rates of 0-50, collagen hydrolysates and gelatin precursors, such as collagen, in particular collagen with an average molecular weight of 200-400 KD.

Any type of gelling gelatin, i.e. both acidic and alkaline gelatin, but also irrespective of the gelatin source (beef, calf, pig etc.), can be used in our invention. However, enzymically made gelling gelatin can also be applied. Although gelatin with high bloom rates, i.e. rates of about 100-300, give slightly better results, gelatins with bloom rates of 50-100 also give excellent results.

A non-gelling gelatin derivative is defined here as a gelatin derivative, that displays no, or hardly any gel formation when tested on bloom-rate according to the standard bloom-rate measurement technique. Examples of those derivatives are gelatins with bloom-rates below 50 and in particular hydrolysed gelatin derivatives. Hydrolysed gelatin derivates display in general bloom-rates of zero and therefore are no gelling agents at all. The hydrolysed gelatins can be obtained in any way known in the prior art. So hydrolysis by using an acid, but also by using an enzyme, in particular protease can be applied in order to prepare the desired products.

The average molecular weight of hydrolysed gelatin varies in general from 200-5000 D, although also values above 5000 D can be obtained.

In case collagen hydrolysates are used it is preferred that the average molecular weight thereof is between 5 and 35 KD.

Any type of gelatin, i.e. acidic, alkaline and enzymically made gelatin, but also irrespective of the gelatin source (beef, calf, pig etc.) can be used for the preparation of the non-gelling gelatins according to our invention.

In fact, deep-frozen, pre-proofed doughs are aimed at which, in addition to the conventional dough-forming ingredients, also contain 0.5-10 wt. % of a gelatin relating compound so that, after baking, a moulded piece of dough gives a baked product with an ovenspring of at least 2.0, preferably 3.0-5.0 ml/g.

Further, deep-frozen, pre-proofed doughs are aimed at which, in addition to the conventional dough-forming ingredients, also contain 0.5-10 wt % of the gelatin derivative so that, after baking, a moulded piece of dough gives a baked product with specific volume of at least 4.23, preferably more than 4.50 ml/g.

In addition to the gelatin relating compound, the doughs can also contain one or more ingredients chosen from the group consisting of ascorbic acid, vital gluten, xylanase, amylase and DATA esters. In particular, the combination of gelatin and xylanase and/or amylase leads to unexpectedly good results.

The amounts of these extra additives (based on flour) vary from 0.02-0.8 wt. % for xylanase and/or amylase and/or DATA esters to 1-5 wt. % for the vital gluten, L while ascorbic acid is used in amounts of 0.005-0.03 wt. %.

Deep-frozen, pre-proofed doughs that are particularly preferred contain 3-7 wt. % of the gelatin relating compound, preferably gelling gelatin, 3-5 wt. % of vital gluten, 0.03-0.06 wt. % of xylanase and/or amylase and 0.3-0.7 wt. % of DATA esters.

The baked products obtainable after baking of the moulded pieces of dough with the composition according to the invention are also part of the invention. These products comprise in particular buns, Danish pastries, croissants and French breads, such as baguettes.

Another part of the invention is the process for the preparation of the doughs. In this process an important feature is that the gelatin relating compounds that are not soluble in cold water should be added to the other ingredients as a solution, preferably as a 3-20 wt. % solution, in water. In case a non-instant gelatin is used the temperature of this solution should be above ambient; otherwise no suitable dough with a homogeneously distributed gelatin can be obtained. However, the mixing of the ingredients should be performed in such a way that the temperature during the mixing does not become too high (i.e. below 35° C., in particular below 30° C.). This can be achieved by adding the water, added as dough-forming ingredient, as ice to the mixture. Another way to achieve this is by using cooled flour.

In the process at least one partial pre-proofing for at least 5 minutes is performed. The temperature during this partial pre-proofing should preferably not exceed the temperature of the mixing of the components.

After the partial pre-proofing, resting steps can be performed but these steps can also be omitted.

In the following step of the process, the dough is proofed completely, preferably below 35° C.,, for 30-90 minutes. The fully proofed dough is frozen by cooling to −10° to −35° C.. within 0.5-8 hours.

The deep-frozen, pre-proofed dough can be stored at temperatures from −5° to −35° C. preferably −10° to −20° C.

The moulding of the dough is usually carried out after at least one partial pre-proofing step has finished. If laminated doughs are prepared, the lamination is preferably carried out with the dough, obtained after kneading and one or more resting step(s).

The baking of the moulded, deep-frozen, pre-proofed dough is performed by transferring the moulded dough directly from the freezer to the oven and baking the product at 180°-240° C. for 15-60 minutes.

The specific volumes of the products are measured according to the seed displacement method. Measurements of the baked products were performed on products that were cooled for 60 minutes at ambient temperature.

The ovenspring is calculated as the difference in specific volumes of the products after baking and before baking.

EXAMPLES 1-22

The following recipe was used in all the Examples:

|  | Baker % | % | g |
|---|---|---|---|
| Columbus (Dutch wheat flour) | 100 | 60.61 | 2000 |
| Salt | 2 | 1.21 | 40 |
| Yeast (Koningsgist) ® | 5 | 3.03 | 100 |
| Water | 58-68 |  | 1160-1260 |
| ASC = Ascorbic acid | | | |
| GEL = Gelatin[1] | in amounts | | |
| GLU = Gluten[2] | as indicated | | |
| XYL = Xylanase[3] | hereinafter | | |
| DAT = DATA[4] | | | |

[1] 102-500, 250 bloom, Rousselot Benelux
[2] Protinax, Latenstein
[3] FP 5222, Quest (contains also some α-amylase)
[4] Admul 1938, Quest The ingredients were kneaded at a temperature below 27° C. After kneading, pre-proofing was carried out for 15 minutes at 30° C. The pre-proofed dough was moulded in pieces of 50 g. The moulded dough was subjected to a second proofing for 60 minutes at 32° C. and 85% RH.

In the direct baking experiments, the pieces of dough were directly baked at 230° C. for 18 minutes, using a Probat oven.

In concurrent experiments, the pieces of dough were frozen at −35° C. for 60 minutes in a Koma blast-freezer. The frozen pieces were stored for 1 week at −20° C. The stored pieces of dough were baked directly from the freezer at 220° C. for 20 minutes in the Probat oven. S.V. values were measured 60 minutes after cooling of the baked buns, using the seed displacement method.

The results are given in the following Table I:

TABLE I

| Trial Nr. | Comparative Examples ||||||||||| |
|---|---|---|---|---|---|---|---|---|---|---|---|
|  | 1 | 2 | 3 | 4 | 5 | 6 | 7 | 8 | 9 | 10 | 11 |
| Add. g/100% flour | | | | | | | | | | | |
| ASC | — | 0.02 | — | — | — | 0.02 | 0.02 | 0.02 | — | — | — |
| GEL | — | — | — | — | — | — | — | — | — | — | — |
| GLU | — | — | 4 | — | — | 4 | — | — | 4 | 4 | — |
| XYL | — | — | — | — | 0.05 | — | — | 0.05 | — | 0.05 | 0.05 |
| DAT | — | — | — | 0.5 | — | — | 0.5 | — | 0.5 | — | 0.5 |
| H2O | 58 | 58 | 62 | 58 | 58 | 62 | 58 | 58 | 62 | 62 | 58 |
| Results | | | | | | | | | | | |
| S.V. ml/g | 5.0 | 6.0 | 6.1 | 7.2 | 8.0 | 8.1 | 8.5 | 9.4 | 8.2 | 8.6 | 9.1 |

TABLE I-continued

| fresh | | | | | | | | | | | |
|---|---|---|---|---|---|---|---|---|---|---|---|
| S.V. after frozen storage | 3.0 | 3.8 | 3.3 | 3.3 | 3.8 | 4.2 | 3.6 | 5.2 | 3.7 | 4.0 | 3.8 |
| Ovenspring: ml/g (fresh) | 1.8 | 4.2 | 2.9 | 3.3 | 3.8 | 4.6 | 4.9 | 5.5 | 4.4 | 5.0 | 5.4 |
| Ovenspring (after fr. stor.) | −0.2 | 0.0 | 0.1 | −0.5 | −0.4 | 0.7 | 0.0 | 1.3 | −0.1 | 0.4 | 0.1 |

| | | According to invention | | | | | | | |
|---|---|---|---|---|---|---|---|---|---|
| Trial Nr. | | 12 | 13 | 14 | 15 | 16 | 17 | 18 | 19 |
| Add. g/100% flour | | | | | | | | | |
| ASC | | — | 0.02 | — | — | 0.02 | 0.02 | — | — |
| GEL | | 5 | 5 | 5 | 5 | 5 | 5 | 5 | 5 |
| GLU | | — | — | 4 | — | — | 4 | 4 | — |
| XYL | | — | — | — | 0.05 | 0.05 | 0.05 | 0.05 | — |
| DAT | | — | — | — | — | — | 0.5 | — | 0.5 |
| H$_2$O | | 64 | 64 | 68 | 64 | 64 | 68 | 68 | 68 |
| Results | | | | | | | | | |
| S.V. ml/g fresh | | 9.2 | 8.3 | 9.9 | 10.3 | 11.6 | 12.6 | 11.3 | 10.0 |
| S.V. after frozen storage | | 5.9 | 4.9 | 6.6 | 6.5 | 7.6 | 7.6 | 7.0 | 5.4 |
| Ovenspring: ml/g (fresh) | | 5.6 | 4.7 | 6.2 | 6.8 | 7.6 | 8.5 | 7.8 | 6.3 |
| Ovenspring (after fr. stor.) | | 2.3 | 1.3 | 2.9 | 3.0 | 3.6 | 3.5 | 3.5 | 1.7 |

From the results the following can be concluded:

1. The presence of gelatin leads to higher S.V. and overspring for the baked, deep-frozen buns.
2. Although ascorbic acid could be used in combination with the other additives, it sometimes had a negative effect on S.V. and overspring (cf. trials 12 and 13, for example).
3. The best results were obtained when gelatin was present in combination with at least xylanase (cf. trials 15-18).

In the trials 20-22 a comparison was made between the use of
1) a combination of gelatin/gluten/xylanase and
2) a combination of gluten/xylanase/egg white and
3) only egg-white (=according to U.S. Pat. No. 4,406,911)

| | acc. invention | comp. examples | |
|---|---|---|---|
| Trial | 20 | 21 | 22 |
| Add g/100% flour | | | |
| gelatin | 5.0 | — | — |
| gluten | 4.0 | 4.0 | — |
| xylanase | 0.05 | 0.05 | — |
| egg-white (solid) | — | 44.00 | 10.00 |
| Results | | | |
| S.V. fresh ml/g | 11.8 | 9.2 | 5 |
| Ovenspring ml/g | 3.8 | 0.5 | −0.1 |
| S.V. after 1 week frozen ml/g | 7.9 | 4.3 | 3.1 |

As is evident from these experiments trial 20 led to superior results.

EXAMPLES 23-39

The following recipe was used in all the Examples:

| | Baker % | % | g |
|---|---|---|---|
| Columbus (Dutch wheat flour) | 100 | 60.61 | 2000 |
| Salt | 2 | 1.21 | 40 |
| Yeast (Koningsgist) ® | 5 | 3.03 | 100 |
| Water | 58-68 | | 1160-1140 |
| ASC = Ascorbic acid | | | |
| Hydr. GEL = hydrolysed gelatin[1] | | in amounts | |
| GLU = Gluten[2] | | as indicated | |
| XYL = Xylanase[3] | | hereinafter | |
| DAT = DATA[4] | | | |

[1] Gelita SolD ® - Deutsche Gelatine Fabriken
[2] Protinax, Latenstein
[3] FP 5222, Quest (contains some α amylase)
[4] Admul 1938, Quest The ingredients were kneaded at a temperature below 27° C. After kneading, pre-proofing was carried out for 15 minutes at 30° C. The pre-proofed dough was moulded in pieces of 50 g. The moulded dough was subjected to a second proofing for 60 minutes at 32° C. and 85% RH.

In the direct baking experiments, the pieces of dough were directly baked at 230° C. for 18 minutes, using a Probat oven.

In concurrent experiments, the pieces of dough were frozen at −35° C. for 60 minutes in a Koma blast-freezer. The frozen pieces were stored for 1 week at −20° C. The stored pieces of dough were baked directly from the freezer at 220° C. for 20 minutes in the Probat oven. S.V. values were measured 60 minutes after cooling of the baked buns, using the seed displacement method.

The results are given in the following Table II:

TABLE II

| | Comparative Examples 23-29 | | | | | | | According to invention | | | | | | |
|---|---|---|---|---|---|---|---|---|---|---|---|---|---|---|
| | 23 | 24 | 25 | 26 | 27 | 28 | 29 | 30 | 31 | 32 | 33 | 34 | 35 | 36 |
| Asc. acid | | 0.02 | | | 0.02 | | | | 0.02 | | | 0.02 | | |
| hydr. GEL | | | | | | | | 5 | 5 | 5 | 5 | 5 | 5 | 5 |

TABLE II-continued

| | Comparative Examples 23-29 | | | | | | | According to invention | | | | | | |
|---|---|---|---|---|---|---|---|---|---|---|---|---|---|---|
| | 23 | 24 | 25 | 26 | 27 | 28 | 29 | 30 | 31 | 32 | 33 | 34 | 35 | 36 |
| Gluten | | 4 | | | | 4 | | | 4 | | | | 4 | |
| Enzyme (Xylanase) | | | | | 0.05 | 0.05 | 0.05 | | | | 0.05 | 0.05 | 0.05 | |
| Data ester | | | | 0.5 | | | | | | | | | | 0.5 |
| Water | 58 | 58 | 62 | 58 | 58 | 62 | 58 | 58 | 58 | 62 | 58 | 58 | 62 | 58 |
| S.V. (fresh) ml/g | 6.22 | 6.49 | 7.82 | 6.40 | 7.41 | 8.30 | 6.71 | 7.84 | 7.42 | 8.90 | 8.99 | 8.66 | 8.41 | 7.27 |
| S.V. (frozen) ml/g | 3.07 | 3.57 | 3.41 | 3.03 | 3.95 | 4.20 | 3.51 | 4.58 | 4.10 | 4.23 | 5.03 | 5.40 | 5.37 | 4.34 |

From the results the following can be concluded:

1. The presence of hydrolyzed gelatin leads to higher S.V. and overspring for the baked, deep-frozen buns.
2. Although ascorbic acid could be used in combination with the other additives, it sometimes had a negative effect on S.V. and overspring (cf. trial 31).
3. The best results were obtained when hydrolysed gelatin was present in combination with xylanase and gluten (cf. trials 33-35).

In the trials 37-39 a comparison was made between the use of 1) a combination of hydrolysed gelatin/-gluten/xylanase and 2) a combination of gluten/xylanase/egg white and 3) only egg-white (=according to U.S. Pat. No. 4,406,911)

| | acc. invention | comp. examples | |
|---|---|---|---|
| Trial | 37 | 38 | 39 |
| Add g/100% flour | | | |
| hydr. gelatin | 5.0 | — | — |
| gluten | 4.0 | 4.0 | — |
| xylanase | 0.05 | 0.05 | — |
| egg-white (solid) | — | 44.00 | 10.00 |
| Results | | | |
| S.V. fresh ml/g | 8.41 | 9.2 | 5 |
| S.V. after 1 week frozen ml/g | 5.37 | 4.3 | 3.1 |

As is evident from these experiments trial 37 led to superior results.

EXAMPLE 40

The standard recipe of example 12 was used. The gelatin, however, was replaced by the same amount of a hydrolysed collagen, i.e. Gelita-Collagel ® (Deutsche Gel. Fabr.). The baked product displayed an SV (fresh baked)=10, an SV (frozen) of 6.2 ml/g.

We claim:

1. A deep-frozen, pre-proofed dough comprising flour, water, yeast, and 0.5-10 wt. % based on the flour, of gelatin compound selected from the group consisting of gelling gelatin with a bloom rate of 50-300 and non-gelling gelatin with a bloom rate of 0-50.

2. Deep-frozen, pre-proofed dough according to claim 1, wherein the dough is a lean dough with less than 10 wt. %, based on the flour, of fat.

3. Deep-frozen, pre-proofed dough according to claim 1, wherein the dough is shaped as a laminated dough wherein the different dough layers are separated by fat layers.

4. Deep-frozen, pre-proofed dough according to claim 1, wherein the dough also contains one or more of the ingredients chosen from the group consisting of ascorbic acid, vital gluten, xylanase, amylase and DATA (diacetyl tartaric acid esters of mono- and/or diglycerides) esters.

5. Deep-frozen, pre-proofed dough according to claim 4, wherein the dough contains 0.02-0.8 wt % xylanase and/or amylase, based on the flour.

6. Deep-frozen, pre-proofed dough according to claim 1, wherein a molded piece of dough, after baking, gives a baked product with an overspring of at least 2.0 ml/g.

7. Deep-frozen, pre-proofed dough according to claim 1, wherein a molded piece of dough, after baking, gives a baked product with a specific volume of at least 4.23 ml/g.

8. Process for improving the specific volume and/or overspring of products made from deep-frozen, pre-proofed doughs the process comprising baking, without thawing, the deep-frozen dough of claim 1.

9. A process for the preparation of a deep-frozen preproofed doughs by carrying out the following steps:
   a) preparing at a temperature above ambient, a 3-20 wt. % aqueous solution of gelatin compound selected from the group consisting of gelling gelatin with a bloom rate of 50-300 and non-gelling gelatin with a bloom rate of 0-50;
   b) mixing flour and yeast with the solution obtained in a);
   c) partial pre-proofing of the dough at least once for at least 5 minutes;
   d) proofing of the dough until the complete proofing has been achieved;
   e) freezing of the dough to a temperature of less than −10° C.

10. Process according to claim 9, wherein in case a non-instant gelatin is used, in step b), the mixing is carried out by the addition of water as ice, in order to lower the temperature of the dough.

11. Process according to claim 10, wherein a maximum temperature of 35° C. is not exceeded in step b).

12. Process according to claim 9, wherein step d) is carried out at a temperature below 35° C. for 30-90 minutes.

13. Process according to claim 9, wherein step e) is carried out by freezing to −10° to −35° C. within 1-8 hours.

14. The process of claim 9, the process further comprising the step of allowing the dough to rest after the partial pre-proofing step c).

* * * * *